(12) United States Patent
Stephens et al.

(10) Patent No.: US 11,946,827 B2
(45) Date of Patent: Apr. 2, 2024

(54) VALVE TESTING APPARATUS

(71) Applicant: Honda Motor Co., Ltd., Tokyo (JP)

(72) Inventors: Kaleb Stephens, Pell City, AL (US); John Michael Scelsi, Pell City, AL (US)

(73) Assignee: Honda Motor Co., Ltd., Tokyo (JP)

( * ) Notice: Subject to any disclaimer, the term of this patent is extended or adjusted under 35 U.S.C. 154(b) by 290 days.

(21) Appl. No.: 17/346,148

(22) Filed: Jun. 11, 2021

(65) Prior Publication Data

US 2022/0397485 A1 Dec. 15, 2022

(51) Int. Cl.
*G01M 15/04* (2006.01)
*G01M 13/003* (2019.01)
*F01L 1/047* (2006.01)

(52) U.S. Cl.
CPC ........ *G01M 15/042* (2013.01); *G01M 13/003* (2019.01); *F01L 1/047* (2013.01)

(58) Field of Classification Search
CPC ... G01M 15/042; G01M 13/003; F01L 1/047; F01L 1/08; F01L 9/20; F01L 1/352; F01L 1/344; F01L 1/356; F01L 1/267; F01L 1/3442; F01L 1/053; F01L 1/34; F01L 13/00; F01L 2001/0473; F01L 2001/0476; F01L 2001/34496; F01L 2001/0537; F01L 13/111; F01L 13/103; F01L 13/0052; F01L 2820/032; F01L 2820/041; F01L 2305/00; G01L 5/00; F02D 41/22; F02D 41/1498; F02D 13/0207
USPC ........................................ 123/90.6
See application file for complete search history.

(56) References Cited

U.S. PATENT DOCUMENTS

| | | | |
|---|---|---|---|
| 2,960,163 | A | 11/1960 | Handley |
| 7,063,057 | B1 * | 6/2006 | Waters ................. F02D 41/221 123/90.16 |
| 10,794,242 | B2 | 10/2020 | Persson |
| 2003/0005899 | A1 * | 1/2003 | Scheidt ..................... F01L 1/34 123/90.17 |
| 2005/0241597 | A1 | 11/2005 | Weber et al. |

(Continued)

FOREIGN PATENT DOCUMENTS

| CN | 101619663 B | 8/2012 |
|---|---|---|
| CN | 103590868 B | 3/2016 |

(Continued)

*Primary Examiner* — Kenneth J Hansen
*Assistant Examiner* — Kelsey L Stanek
(74) *Attorney, Agent, or Firm* — Suzanne Gagnon; American Honda Motor Co., Inc.

(57) ABSTRACT

An apparatus is provided to test valves. The apparatus includes a support structure and a plurality of engagement members coupled to the support structure. Each member of the plurality of engagement members is coupled with a valve of a valve train associated with an engine head. The apparatus further includes a camshaft, which includes a plurality of lobes coupled to the support structure. Each lobe of the plurality of lobes are equally spaced from each other and coupled to a member of the plurality of engagement members. The apparatus further includes a driving mechanism coupled to the camshaft, which is configured to rotate the camshaft and control each member of the plurality of engagement members to further control an activation of each valve of the valve train associated with the engine head.

19 Claims, 8 Drawing Sheets

(56) References Cited

U.S. PATENT DOCUMENTS

| | | | |
|---|---|---|---|
| 2007/0089706 A1 | 4/2007 | Weber et al. | |
| 2014/0137819 A1* | 5/2014 | McConville | F02D 13/06 123/90.6 |
| 2018/0038325 A1 | 2/2018 | Beyer et al. | |
| 2020/0072098 A1* | 3/2020 | Kaan | F01L 13/0036 |

FOREIGN PATENT DOCUMENTS

| | | |
|---|---|---|
| DE | 4412548 A1 | 10/1995 |
| DE | 102014219254 A1 | 4/2015 |
| EP | 1144810 A1 | 10/2001 |
| JP | H08312443 A | 11/1996 |
| JP | 4038545 B1 | 1/2008 |
| JP | 2008025541 A | 2/2008 |
| KR | 200438512 Y1 | 2/2008 |
| WO | 2018169861 A1 | 9/2018 |

\* cited by examiner

VALVE TESTING APPARATUS

CROSS-REFERENCE TO RELATED APPLICATIONS

The present application is related to co-pending patent application U.S. Ser. No. 17/346,133, filed on the same date as the present application, entitled VALVE TESTING FOR ENGINES, which is incorporated herein by reference in its entirety.

BACKGROUND

Valves may be generally used to control a fluid flow (such as an airflow, a gasoline flow, or a combination of both) in a machine (such as an engine). Valves may releasably couple with ports (such as inlet and outlet ports) of the machine and configured to control the fluid flow in the machine. In certain cases, there may be an abnormality (such as an interference between the valves and the ports, or a leakage between the valves and the ports) during installation of the valves. Such abnormality during installation of the valves may lead to improper valve actuations and may subsequently affect performance of the machine. Therefore, during the installation of the valves, it may be necessary to test an assembly between the valves and the ports of the machine.

Further, it may also be necessary to redundantly test the assembly between the valves and the ports of the machine for a plurality of occurrences, so that, there may be a precision in the assembly between the valves and the ports of the machine. Hence, there is a need for a system that could redundantly test the assembly between the valves and the ports of the machine, with a minimal cycle time (such as a reduction in a time that may have incurred to redundantly test the assembly between the valves and the ports of the machine).

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An exemplary aspect of the disclosure provides an apparatus. The apparatus may include a support structure with a base and a wall coupled substantially perpendicular to the base. The base may have a first surface and a second surface. The apparatus may further include a plurality of engagement members coupled substantially perpendicular to the base and moveably extend from the first surface to the second surface. Each member of the plurality of engagement members may include a first end and a second end. The second end of one of the plurality of engagement members may be configured to be coupled with a valve of a valve train associated with an engine head. The apparatus may further include a camshaft, which may include a plurality of lobes coupled substantially perpendicular to the wall and configured to rotate about an axis that is substantially parallel to the base. Each lobe of the plurality of lobes is equally spaced from each other and coupled to the first end of one of the plurality of engagement members. The apparatus may further include a driving mechanism coupled to the camshaft. The driving mechanism may be configured to rotate the camshaft and control each member of the plurality of engagement members to further control an activation of each valve of the valve train associated with the engine head.

Another exemplary aspect of the disclosure provides an apparatus. The apparatus includes a support structure. The apparatus further includes a plurality of engagement members coupled to the support structure. Each member of the plurality of engagement members may be configured to be coupled with a valve of a valve train associated with an engine head. The apparatus further includes a camshaft, which may include a plurality of lobes coupled to the support structure. Each lobe of the plurality of lobes may be equally spaced from each other and coupled to a member of the plurality of engagement members. The apparatus may further include a driving mechanism coupled to the camshaft. The driving mechanism may be configured to rotate the camshaft and control each member of the plurality of engagement members to further control an activation of each valve of the valve train associated with the engine head.

Another exemplary aspect of the disclosure provides an apparatus. The apparatus includes a support structure. The apparatus further includes a plurality of engagement members coupled to the support structure. Each member of the plurality of engagement members may be configured to be coupled with a part of a plurality of parts associated with a machine. The apparatus further includes a camshaft, which may include a plurality of lobes coupled to the support structure. Each lobe of the plurality of lobes may be equally spaced from each other and coupled to a member of the plurality of engagement members. The apparatus may further include a driving mechanism coupled to the camshaft. The driving mechanism may be configured to rotate the camshaft and control each member of the plurality of engagement members to further control an activation of each part of the plurality of parts associated with the machine.

This summary is provided to introduce a selection of concepts in a simplified form that are further disclosed in the detailed description of the present disclosure. This summary is not intended to identify key or essential inventive concepts of the claimed subject matter, nor is it intended for determining the scope of the claimed subject matter.

Figure 1:
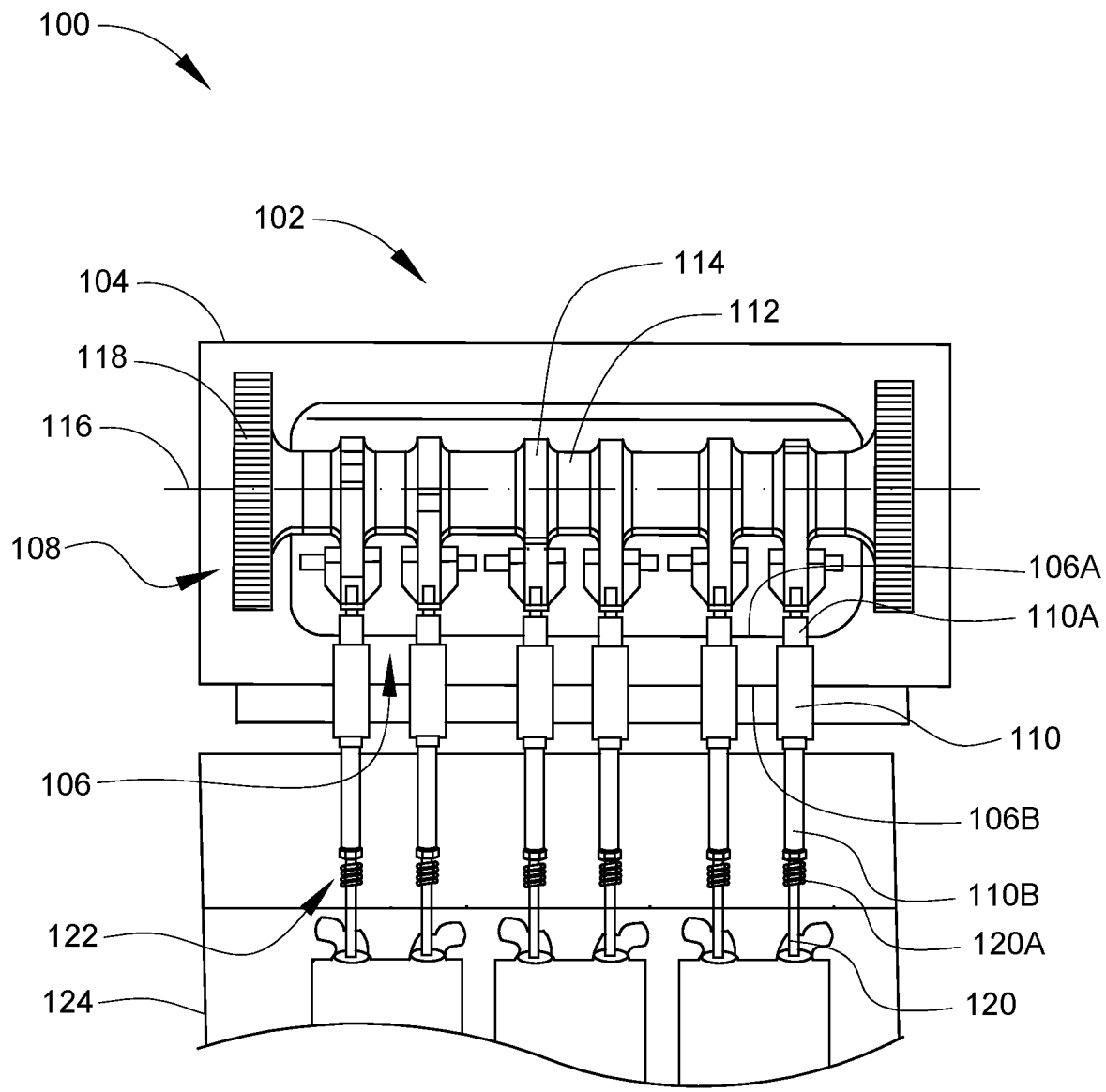
FIG. 1 is a diagram that illustrates an exemplary apparatus for valve testing, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may provide an apparatus, for example, an apparatus to test an assembly of valves of a machine (such as an engine head). The apparatus may include a support structure, a plurality of engagement members (such as followers) coupled to the support structure, a camshaft coupled to the support structure, and a driving mechanism to rotate the camshaft. Each of the plurality of engagement members may include a first end and a second end. The camshaft may have a plurality of lobes. Each of the plurality of lobes may be coupled to the first end of one of the plurality of engagement members. The second end of one member of the plurality of engagement members may be coupled to a valve of a valve train associated with the engine head. The driving mechanism may be configured to rotate the camshaft and control each member of the plurality of engagement members to further control an activation of each valve of the valve train associated with the engine head. Hence, based on the activation of each valve of the valve train, the assembly of the valve train may be tested for an abnormality (such as an interference or a leakage) in the assembly of the valve train.

In an embodiment, the plurality of lobes of the camshaft may be equally indented, from an axis of the camshaft, at different angular configurations in each plane of a plurality of planes of the camshaft. Each lobe of the plurality of lobes may have a first profile (such as a pear shape) and configured to activate corresponding valve of the valve train at different angular configurations of the camshaft, based on the rotation of the camshaft. For example, at every 60 degrees of rotation of the camshaft, a particular valve of the valve train may be actuated. Therefore, in such configuration of the camshaft, it may be observed that each valve of the valve train may be independently tested for the abnormality. Based on independent testing of each valve of the valve train, each valve may be selectively adjusted based on the detected abnormality on each valve of the valve train. Such selective adjustment may enhance a quality of the valve train assembly on the engine head. Details of such configuration of the camshaft is further described, for example, in FIGS. 2A-2C.

In another embodiment, the plurality of lobes of the camshaft may be disposed at a fixed angle, from the axis of the camshaft, in each plane of the plurality of planes of the camshaft. Each lobe of the plurality of lobes may have a second profile (such as an eight-power polynomial single lobe) and configured to activate corresponding valve of the valve train at a fixed angular configuration of the camshaft, based on the rotation of the camshaft. For example, at a specific degree (such as 90 degrees) of rotation of the camshaft, a valve of the valve train may be actuated. Further, in such configuration of the camshaft, it may be observed that, due to the eight-power polynomial single lobe profile of each lobe of the plurality of lobes, each valve of the valve train may be slowly actuated (such as a $8^{th}$ order polynomial lift) with a high precision. For example, based on the slow actuation, each valve of the valve train may be tested at each frames of rotation of the camshaft with the high precision. Therefore, in such configuration of the camshaft, it may be observed that each valve of the valve train may be tested for the abnormality with the high precision. Such high precision in the testing of the valves may improve machine life (such as an engine life) and further enhance a quality of the valve train assembly on the engine head. Details of such configuration of the camshaft is further described, for example, in FIGS. 3A-3C.

In yet another embodiment, the plurality of lobes of the camshaft may be disposed in at least one of the plurality of planes of the camshaft. Each lobe of the plurality of lobes may have a multilobe structure (such as a toothed gear profile) and configured to activate each valve of the valve train for a plurality of occurrences, based on the rotation of the camshaft. For example, at every 60 degrees of rotation of the camshaft, all valves of the valve train may be actuated simultaneously. Therefore, in such configuration of the camshaft, it may be observed that each valve of the valve train may be tested for the plurality of occurrences to determine the abnormality. Based on the plurality of occurrences, each valve may be redundantly tested, so that, there may be a precision in the assembly of valves in the engine head. Further, as the camshaft have the multilobe structure, the plurality of occurrences of testing the valves may be performed with a minimal cycle time. Details of such configuration of the camshaft is further described, for example, in FIGS. 4A-4C.

Reference will now be made in detail to specific aspects or features, examples of which are illustrated in the accompanying drawings. Wherever possible, corresponding or similar reference numbers will be used throughout the drawings to refer to the same or corresponding parts.

FIG. 1 is a diagram that illustrates an exemplary apparatus for valve testing, in accordance with an embodiment of the disclosure. With reference to FIG. 1, there is shown an exemplary view 100 of an apparatus 102. The apparatus 102 may include a support structure 104 having a base 106 and a wall 108. The apparatus 102 may further include a plurality of engagement members 110 that may be coupled substantially perpendicular to the base 106. The apparatus 102 may further include a camshaft 112 that may include a plurality of lobes 114 coupled substantially perpendicular to the wall 108 and configured to rotate about an axis 116 that may be substantially parallel to the base 106. The apparatus 102 may further include a driving mechanism 118 that may be coupled to the camshaft 112. In an embodiment, at least one of the plurality of engagement members 110 of the apparatus 102 may be configured to be coupled with a valve 120 of a valve train 122 associated with an engine head 124, to test the valve 120 for an abnormality (such as an interference between the valves and the ports, or a leakage between the valves and the ports) during installation of valves of the valve train 122.

The apparatus 102 may be configured to test the abnormality in each of the valve 120 of the valve train 122. For example, the apparatus 102 may be configured to translate at least one member of the plurality of engagement members 110 coupled with the valve 120 of the valve train 122, to activate the valve 120. Based on the activation of the valve 120, the abnormality associated with the valve 120 may be tested. In an embodiment, the apparatus 102 may be disposed on a floor (such as an assembly line of a manufacturing unit) to test the abnormality in the valve 120 of the valve train 122. In some implementations, the apparatus 102 may be configured to be interchangeably coupled with variable camshafts (such as camshafts shown in FIGS. 2A-2C, FIGS. 3A-3C, and FIGS. 4A-4C), based on user requirements. Details of such implementations are further described, for example, in FIGS. 2A-2C, FIGS. 3A-3C, and FIGS. 4A-4C. In an embodiment, the apparatus 102 may have a substantially rectangular structure. Such substantially rectangular structure may facilitate a stability of the apparatus 102. In other embodiments, the apparatus 102 may also have any structure other than the substantially rectangular structure, which may include, but not limited to, a substantially square structure, or a substantially polygonal structure, etc.

The support structure 104 of the apparatus 102 may be configured to hold and support components (such as the plurality of engagement members 110, the camshaft 112, and the driving mechanism 118) of the apparatus 102. For example, the support structure 104 may include the base 106 to support the plurality of engagement members 110. In another example, the support structure 104 may include the wall 108 to support the camshaft 112 and the driving mechanism 118. In an embodiment, the support structure 104 may form an enclosure that covers all components of the apparatus 102. In another embodiment, the support structure 104 may have a substantially rectangular enclosure with a cavity to hold and support the components of the apparatus 102. Such substantially rectangular enclosure may further enhance the stability of the apparatus 102. In other embodiments, the support structure 104 may also have any structure other than the substantially rectangular enclosure, which may include, but not limited to, a substantially square enclosure, or a substantially polygonal enclosure, etc.

The base 106 of the support structure 104 may be configured to support each member of the plurality of engagement members 110 of the apparatus 102. In an embodiment, the base 106 may include a first surface 106A and a second surface 106B, which may be configured to support each member of the plurality of engagement members 110 of the apparatus 102. For example, the plurality of engagement members 110 may be coupled substantially perpendicular to the base 106 and may be moveably extend from the first surface 106A to the second surface 106B. In an embodiment, the base 106 may be a lowest part of the apparatus 102 that is configured to hold the components (such as the plurality of engagement members 110) of the apparatus 102. In another embodiment, the base 106 may have a substantially rectangular floor to hold and support the components of the apparatus 102. Such substantially rectangular floor may facilitate an optimal space for the components of the apparatus 102. Additionally, the substantially rectangular floor may further enhance the stability of the apparatus 102. In other embodiments, the base 106 may also have any structure other than the substantially rectangular floor, which may include, but not limited to, a substantially circular floor, or a substantially polygonal floor, etc.

The wall 108 of the support structure 104 may be configured to support the components (such as, the camshaft 112 and the driving mechanism 118) of the apparatus 102. For example, the camshaft 112 may be coupled substantially perpendicular to the wall 108 and configured to rotate about the axis 116 that may be substantially parallel to the base 106. In an embodiment, the wall 108 may be disposed substantially perpendicular to the base 106 of the apparatus 102. In another embodiment, the wall 108 may be disposed substantially perpendicular on ends of the base 106, to hold the components (such as, the camshaft 112 and the driving mechanism 118) of the apparatus 102. In some implementations, the wall 108 may be configured to be interchangeably coupled with variable camshafts (such as camshafts shown in FIGS. 2A-2C, FIGS. 3A-3C, and FIGS. 4A-4C), based on user requirements. Details of such implementations are further described, for example, in FIGS. 2A-2C, FIGS. 3A-3C, and FIGS. 4A-4C. In an embodiment, the wall 108 may have a substantially rectangular structure. Such substantially rectangular structure may further improve the stability of the apparatus 102. In other embodiments, the wall 108 may also have any structure other than the substantially rectangular structure, which may include, but not limited to, a substantially curved structure, or a substantially polygonal structure, etc. In an embodiment, the wall 108 may further be configured to enclose the plurality of engagement members 110 disposed on the base 106 of the apparatus 102.

The plurality of engagement members 110 may be configured to receive a rotational force from the camshaft 112 and transmit as a linear force on each of the valve 120 of the valve train 122, to activate each valve 120. For example, the plurality of engagement members 110 may include a first end 110A and a second end 110B. The first end 110A may be coupled to corresponding lobe of the plurality of lobes 114 of the camshaft 112 and the second end 110B may be coupled to the corresponding valve of the valve train 122. Based on the rotation of the camshaft 112, each member of the plurality of engagement members 110 may be configured to translate towards the valve 120 of the valve train 122, to activate the corresponding valve. In an embodiment, each member of the plurality of engagement members 110 may be coupled substantially perpendicular to the base 106 and moveably extend from the first surface 106A to the second surface 106B. In another embodiment, each member of the plurality of engagement members 110 may be coupled to the base 106 at an angular arrangement (such as between 45 degrees to 135 degrees) and moveably extend from the first surface 106A to the second surface 106B of the base 106. Such angular arrangement may facilitate an improved connection between the plurality of engagement members 110 of the apparatus 102 and the valve 120 of the valve train 122. In an embodiment, the plurality of engagement members 110 may have a substantially cylindrical profile, which may facilitate a minimal wear during a translation between the first surface 106A and the second surface 106B of the base 106. In another embodiment, the plurality of engagement members 110 may also form a splined connection (not shown) with the base 106, so that, the plurality of engagement members 110 may be constrained to translate without any wobbling between the first surface 106A and the second surface 106B of the base 106.

In an embodiment, each member of the plurality of engagement members 110 may have a monolithic structure that are configured to be coupled with a corresponding lobe of the plurality of lobes 114 of the camshaft. For example, the plurality of engagement members 110 may be formed from a single block of a metal blank that may have a uniform grain structure and better resistance against any wear due to a usage of the apparatus 102. In an implementation, the monolithic structure may be machined to form the plurality of engagement members 110. In another implementation, the monolithic structure may be formed via other manufacturing process, which may include, but not limited to, a casting process, an additive manufacturing process, and the like. In another embodiment, each member of the plurality of engagement members 110 may be coupled to the base 106, via a splined arrangement. For example, each member of the plurality of engagement members 110 may have a female mating part, which may be configured to engage with a male mating part of the base 106 (or vice versa) and form a rigid connection at an optimal angular configuration, based on the user requirements. In an embodiment, based on the optimal angular configuration, the apparatus 102 may couple the first end 110A of each member of the plurality of engagement members 110 with corresponding lobe of the plurality of lobes 114 of the camshaft 112.

The camshaft 112 may be configured to rotate about the axis 116 that may be substantially parallel to the base 106, to drive each member of the plurality of engagement members 110. For example, based on a rotation of the camshaft 112, each lobe of the plurality of lobes 114 of the camshaft 112 may be configured to drive corresponding member of the plurality of engagement members 110. In an embodiment, the camshaft 112 may be coupled substantially perpendicular to the wall 108 of the support structure 104 and configured to rotate about the axis 116 that may be parallel to the base 106. In another embodiment, the camshaft 112 may be coupled at an angular configuration (such as between 45 degrees to 135 degrees) against the wall 108 of the support structure 104. Such angular arrangement may facilitate an improved connection between each lobe of the plurality of lobes 114 with corresponding member of the plurality of engagement members 110 of the apparatus 102. In some implementations, there may be variable camshafts (such as camshafts shown in FIGS. 2A-2C, FIGS. 3A-3C, and FIGS. 4A-4C) that may be configured to be interchangeably coupled with the wall 108 of the apparatus 102, based on user requirements. Details of such implementations are further described, for example, in FIGS. 2A-2C, FIGS. 3A-3C, and FIGS. 4A-4C. In an embodiment, the camshaft 112 may have a substantially cylindrical structure. Such substantially cylindrical structure may improve the stability of the apparatus 102 during the rotation of the camshaft 112. In other embodiments, the apparatus 102 may also have any structure other than the substantially cylindrical structure which may include, but not limited to, a substantially polygonal structure, etc.

The plurality of lobes 114 of the camshaft 112 may be configured to rotate along with the camshaft 112, to drive each member of the plurality of engagement members 110. In an embodiment, each lobe of the plurality of lobes 114 may be equally spaced from each other and coupled to the first end 110A of one member of the plurality of engagement members 110. In another embodiment, each lobe of the plurality of lobes 114 may be equally indented from each other and coupled to the first end 110A of one member of the plurality of engagement members 110. In an implementation, based on a rotation of the camshaft 112, each lobe of the plurality of lobes 114 may be configured to translate the corresponding member of the plurality of engagement members 110.

In an embodiment, each lobe of the plurality of lobes 114 of the camshaft 112 may have a monolithic structure (for example, the camshaft 112 may be formed from a single block of a metal blank that may have a uniform grain structure and better resistance against any wear due to the usage of the apparatus 102). In an implementation, the monolithic structure may be machined to form the camshaft 112. In another implementation, the monolithic structure may be formed via other manufacturing process, which may include, but not limited to, a casting process, an additive manufacturing process, and the like. In another embodiment, each lobe of the plurality of lobes 114 may be coupled to the camshaft 112, via a splined arrangement. For example, each lobe of the plurality of lobes 114 may have a female mating part, which may be configured to engage with a male mating part of the camshaft 112 (or vice versa) and form a rigid connection at an optimal angular configuration, based on the user requirements.

Figure 2A:
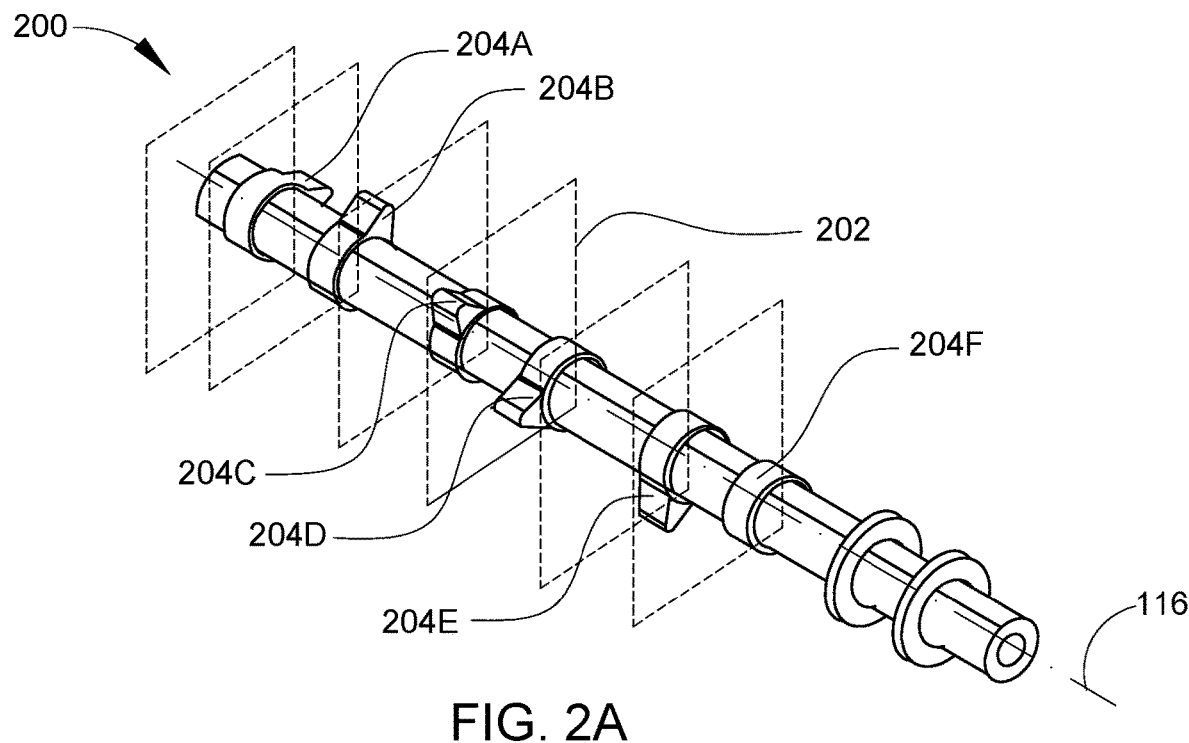
FIGS. 2A-2C are diagrams that collectively illustrate a first implementation of a camshaft of the apparatus of FIG. 1, in accordance with an embodiment of the disclosure.

In an embodiment, the plurality of lobes 114 of the camshaft 112 may be equally indented, from the axis 116 of the camshaft 112, at different angular configurations in each plane of the plurality of planes (as shown in FIG. 2A) of the camshaft 112. Each lobe of the plurality of lobes 114 may have a first profile (such as a pear shape as shown in FIG. 2A) and configured to activate corresponding valve of the valve train 122 at different angular configurations of the camshaft 112, based on the rotation of the camshaft 112. For example, at every 60 degrees of rotation of the camshaft 112, the valve 120 of the valve train 122 may be actuated. Details of such configuration of the camshaft is further described, for example, in FIGS. 2A-2C.

Figure 3A:
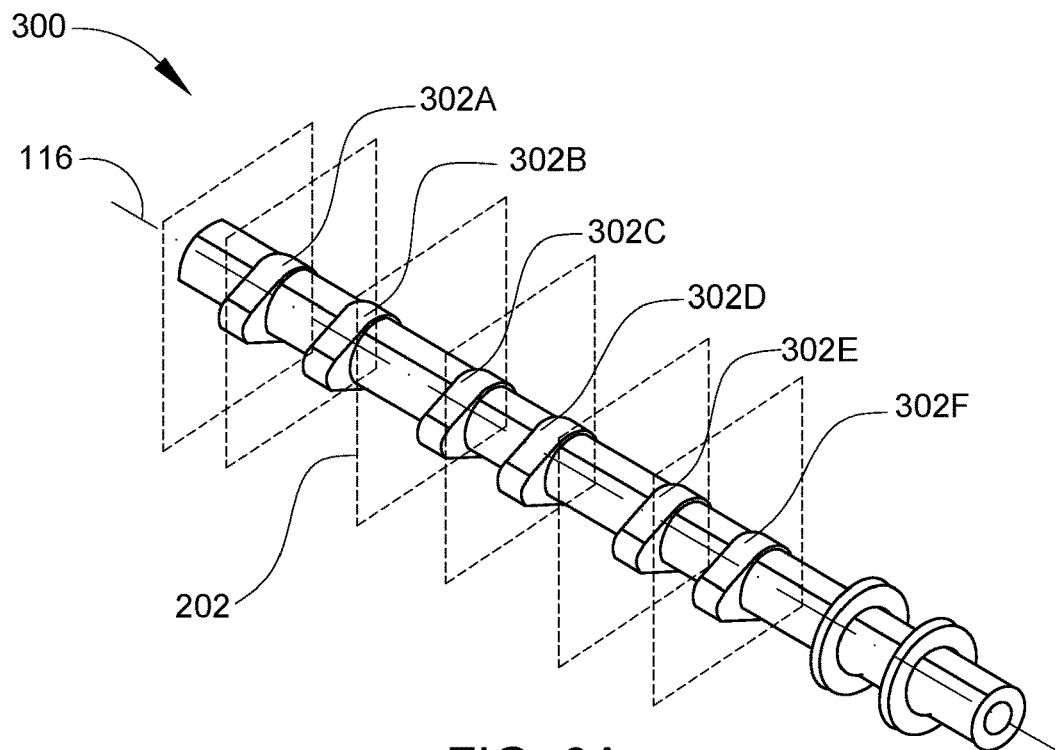
FIGS. 3A-3C are diagrams that collectively illustrate a second implementation of a camshaft of the apparatus of FIG. 1, in accordance with an embodiment of the disclosure.

In another embodiment, the plurality of lobes 114 of the camshaft 112 may be disposed at a fixed angle, from the axis 116 of the camshaft 112, in each plane of the plurality of planes of the camshaft 112. Each lobe of the plurality of lobes 114 may have a second profile (such as an eight-power polynomial single lobe, as shown in FIG. 3A) and configured to activate corresponding valve of the valve train 122 at the fixed angular configuration of the camshaft 112, based on the rotation of the camshaft 112. For example, at a specific degree (such as 90 degrees) of rotation of the camshaft, the valve 120 of the valve train 122 may be actuated. Details of such configuration of the camshaft is further described, for example, in FIGS. 3A-3C.

Figure 4A:
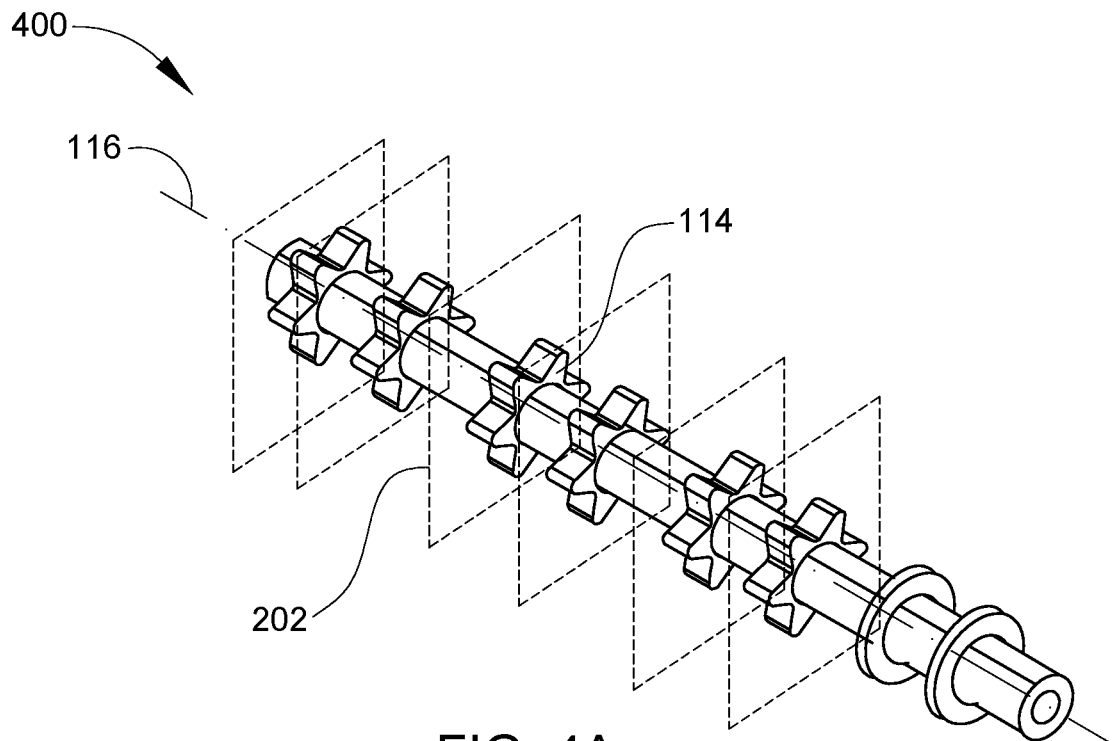
FIGS. 4A-4C are diagrams that collectively illustrate a third implementation of a camshaft of the apparatus of FIG. 1, in accordance with an embodiment of the disclosure.

In yet another embodiment, the plurality of lobes 114 of the camshaft 112 may be disposed in at least one of the plurality of planes of the camshaft 112. Each lobe of the plurality of lobes 114 may have a multilobe structure (such as a toothed gear profile, as shown in FIG. 4A) and configured to activate each valve of the valve train 122 for the plurality of occurrences, based on the rotation of the camshaft 112. For example, at every 60 degrees of rotation of the camshaft 112, all valves of the valve train 122 may be actuated. Details of such configuration of the camshaft is further described, for example, in FIGS. 4A-4C. In an embodiment, each lobe of the plurality of lobes 114 of the camshaft 112 may be rotated based on the driving mechanism 118.

The driving mechanism 118 may be coupled to the camshaft 112 and configured to control the camshaft 112 to rotate along the axis 116 that may be parallel to the base 106. In an embodiment, the driving mechanism 118 may be configured to rotate the camshaft 112 and control each member of the plurality of engagement members 110 to further control the activation of each valve of the valve train 122 associated with the engine head 124. In another embodiment, the driving mechanism 118 may be configured to directly control each member of the plurality of engagement members 110 to further control the activation of each valve of the valve train 122 associated with the engine head 124. In one implementation, the driving mechanism 118 may be directly coupled to the camshaft 112 and disposed in the wall 108 of the support structure 104. In another implementation, the driving mechanism 118 may be remotely coupled to the camshaft 112 and disposed in a part (such as the wall 108 and/or the base 106) of the support structure 104. In yet another implementation, the driving mechanism 118 may be directly coupled to the plurality of engagement members 110 and disposed in the part (such as the wall 108 and/or the base 106) of the support structure 104. In an embodiment, the driving mechanism 118 may be further configured to control at least one of: a position of the camshaft 112, a velocity of the camshaft 112, or an acceleration of the camshaft 112, based on the user requirements. Details of such control of the camshaft 112 are described, for example, in FIGS. 2A-2C, 3A-3C, and 4A-4C. In an embodiment, the driving mechanism 118 may include a servomotor that may be configured to control the rotation of the camshaft 112. In another embodiment, the driving mechanism 118 may include any other mechanisms other than servomotor to control the rotation of the camshaft 112. Examples of other mechanisms may include, but are not limited to, an induction motor-based driving mechanism and the like. Based on the control from the driving mechanism 118 on the camshaft 112, the camshaft 112 may rotate and facilitate a movement of at least one member of the plurality of engagement members 110. Based on the movement of at least one member of the plurality of engagement members 110, the valve 120 may be actuated.

The valve 120 may be configured to releasably control a port (not shown) of the engine head 124. In one example, the valve 120 may control an inlet port of the engine head 124. In another example, the valve 120 may control an outlet port of the engine head 124. In an embodiment, the valve 120 may be a poppet valve and configured to be biased by a valve spring 120A and further disposed in a valve guide (not shown) coupled to at least one port (such as the inlet port or the outlet port) of the engine head 124. Other examples of the valve 120 may include, but not limited to, a sleeve valve, a slide valve, a rotary valve, etc.

In an embodiment, the valve 120 may further include a valve seat, a valve stem, and a valve tip. The valve seat of the valve 120 may be configured to releasably close at least one port (such as the inlet port or the outlet port) of the engine head 124. The valve stem of the valve 120 may be slidably disposed on the valve guide and the valve tip of the valve 120 may protrude from the valve guide. In an embodiment, the valve tip of the valve 120 may be configured to be coupled with the second end 110B of at least one member of the plurality of engagement members 110. Based on the rotation of the camshaft 112, each member of the plurality of engagement members 110 may be configured to be translated, and further activates the corresponding valve tip of the valve 120, to test the valve 120 of the valve train 122.

The valve train 122 may be configured to control a plurality of ports (such as the inlet port, or the exhaust port) of the engine head 124. For example, each cylinder of the engine head 124 may include the inlet port and the exhaust port, which may be releasably closed by a plurality of valves (such as the valve 120) of the valve train 122. In an embodiment, the valve train 122 may be disposed on a top surface of the engine head 124 and configured to releasably close each port of the plurality of ports of the engine head 124. In an embodiment, each valve (such as the valve 120) of the valve train 122 may be activated based on the rotation of the camshaft 112. For example, each valve of the valve train 122 may be activated based on the rotation the camshaft 112 and subsequent translation of each member of the plurality of engagement members 110). In another embodiment, each valve (such as the valve 120) of the valve train 122 may be directly activated (such as, via a solenoid mechanism) by the apparatus 102, without a need of the camshaft 112. For example, each valve of the valve train 122 may be directly activated from an electronic actuation of the solenoid mechanism on each valve (such as the valve 120) of the valve train 122, without any additional member (such as, the camshaft 112 and/or the plurality of engagement members 110) that may be connected with each valve of the valve train 122 of the engine head 124.

The engine head 124 may be configured to hold a plurality of valves (such as the valve 120) of the valve train 122, a plurality of spark plugs (not shown), a plurality of fuel injectors (not shown), etc. In an embodiment, based on an arrangement of the plurality of ports and corresponding valves of the valve train 122, the engine head 124 may have a plurality of configurations. For example, in one implementation, the engine head 124 may have a loop-flow configuration (i.e., the plurality of ports and the valve train 122 are disposed in a single side on the engine head 124), an inline cross flow configuration (i.e., the plurality of ports and the valve train 122 are disposed in on opposing sides on the engine head 124), or an offset cross-flow configuration (i.e., the inlet port and the exhaust port of each cylinder portion of the engine head 124 may be disposed on opposing sides and offset from each other, when such ports and the valve train 122 are located on the engine head 124).

In operation, the apparatus 102 may be a disposed on the floor (such as the assembly line of the manufacturing unit). In an embodiment, the apparatus 102 may be configured to detect the engine head 124 proximate the apparatus 102. For example, the apparatus 102 may detect the engine head 124 based on a detection of an RFID tag (not shown) associated with the engine head 124. Based on the detection of the engine head 124 proximate the apparatus 102, at least one member of the plurality of engagement members 110 of the apparatus 102 may be configured to be coupled with the valve 120 of the valve train 122 associated with an engine head 124, as shown in FIG. 1. In an embodiment, each member of the plurality of engagement members 110 may be axially coupled with a corresponding valve (such as the valve 120) of the valve train 122. In another embodiment, each member of the plurality of engagement members 110 may be angularly coupled with the corresponding valve (such as the valve 120) of the valve train 122, based on user requirements.

Based on an activation of the apparatus 102, the camshaft 112 may be configured to rotate along the axis 116. Based on the rotation of the camshaft 112, apparatus 102 may facilitate a translation of each member of the plurality of engagement members 110. For example, as each member of the plurality of engagement members 110 are coupled with each lobe of the plurality of lobes 114 of the camshaft 112, the rotation of each lobe of the plurality of lobes 114 may control the translation of each member of the plurality of engagement members 110. In an embodiment, the translation of each member of the plurality of engagement members 110 may be controlled by a structural profile of each lobe of the plurality of lobes 114 of the camshaft 112. Details of the structural profile of each lobe of the plurality of lobes 114 are explained further, for example in FIGS. 2A-2C, 3A-3C, and 4A-4C.

Based on the translation of each member of the plurality of engagement members 110, the apparatus 102 may control the activation of each valve (such as the valve 120) of the valve train 122 associated with the engine head 124. For example, as each member of the plurality of engagement members 110 are coupled with each valve (such as the valve 120) of the valve train 122, the translation of each member of the plurality of engagement members 110 may control the activation of each valve (such as the valve 120) of the valve train 122. In an embodiment, the activation of each valve (such as the valve 120) of the valve train 122 may be controlled by a structural preference of each member of the plurality of engagement members 110 of the apparatus 102. For example, the structural preference of the plurality of engagement members 110 may include, but not limited to, a change in height of each member of the plurality of engagement members 110, such that, the activation of each valve (such as the valve 120) of the valve train 122 may be performed, based on the change in height.

In an implementation, in case the height of a member of the plurality of engagement members 110 associated with the valve 120 is larger compared to other members of the plurality of engagement members 110 associated with other valves of the valve train 122, the displacement (of the member of the plurality of engagement members 110 associated with the valve 120) required for the activation of the valve 120 may be less compared to the displacement (of other members of the plurality of engagement members 110) required for the activation of other valves associated with the valve train 122.

In an embodiment, based on the activation of each valve (such as the valve 120) of the valve train 122, the apparatus 102 may be configured to determine an abnormality in each valve (such as the valve 120) of the valve train 122. For example, the abnormality may include information about at least one of: an interference between each valve (such as the valve 120) and corresponding valve guide associated with the engine head 124, an alignment of at least one of: the valve tip, the valve stem, the valve seat, or the valve spring 120A with the corresponding valve guide associated with the engine head 124. In another example, the abnormality may also include information associated with a lubrication of each valve (such as the valve 120) with corresponding valve guide and/or port (such as the inlet port or the exhaust port) associated with the engine head 124.

In an embodiment, based on the determination of the abnormality of each valve (such as the valve 120) of the valve train 122, the apparatus 102 may be further configured to generate a notification for an operator associated with the apparatus 102. For example, the notification may include at least one of: an audible notification, a visual notification, or a tactile notification. In an implementation, the apparatus 102 may include (or may be communicably coupled with) a speaker (not shown) that may be configured to generate the audible notification for the operator. In another implementation, the apparatus 102 may include (or may be communicably coupled with) a display unit (not shown) that may be configured to display the visual notification for the operator. For example, in case of the determination of the abnormality, the display unit may be configured to display information such as, but not limited to, "Abnormal Valve Detected, Please Take Immediate Action". In another example, in case the valve train 122 are determined to be normal based on the activation of each valve of the valve train 122, the display unit may be configured to display information such as, but not limited to, "The assembly is OKAY".

In yet another implementation, the apparatus 102 may include a lighting system (such as a light emitting diode) that may be configured to display the visual notification for the operator. For example, in case of the determination of the abnormality in the valve train 122, the lighting system may be configured to display a red light to indicate the operator that the assembly of the valve train 122 in the engine head 124 is improper and at least one of the valve (such as the valve 120) of the valve train 122 has the abnormality. In another example, in case the valve train 122 are determined to be normal based on the activation of each valve of the valve train 122, the lighting system may be further configured to display a green light to indicate the operator that the assembly of the valve train 122 is normal, and the operator may go ahead for further operations (such as an assembly of a cylinder block (not shown) with the engine head 124).

In an alternative embodiment, instead of coupling each member of the plurality of engagement members 110 with corresponding valve (such as the valve 120) of the valve train 122, the apparatus 102 may also configure each member of the plurality of engagement members 110 to be coupled with a part of a plurality of parts associated with a machine (not shown). Based on the coupling between the part of the machine and the member of the plurality of engagement members 110, the apparatus 102 may configure the driving mechanism 118 to rotate the camshaft 112 and control each member of the plurality of engagement members 110 to further control an activation of each part of the plurality of parts associated with the machine. Based on the activation of each part, the apparatus 102 may be configured to determine an abnormality associated with each part of the plurality of parts associated with the machine. In an implementation, the part may be the valve, and the machine may include at least one of: an exercising machine, a metering device, a laundry machine, or a medical instrument. In an embodiment, the camshaft 112 of the apparatus 102 may be modified and coupled with the part of the plurality of parts associated the machine, based on the user requirements. Details of such modification in the camshaft 112 are further described, for example, in FIGS. 2A-2C, 3A-3C, and 4A-4C.

Figure 2B:
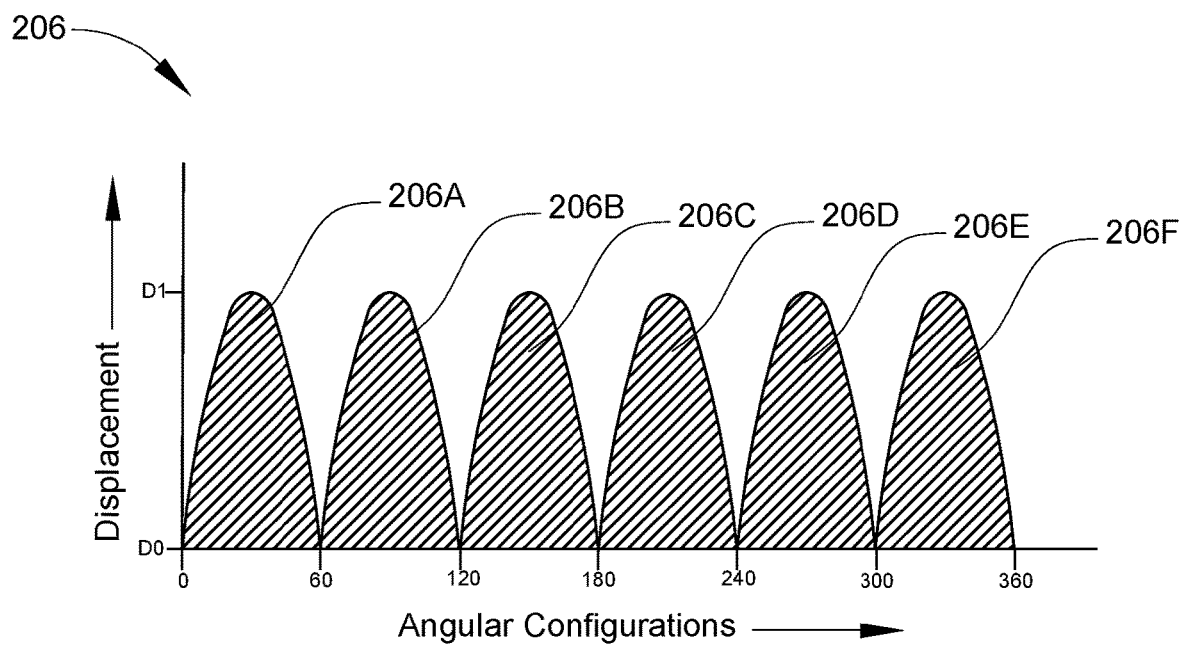
Figure 2C:
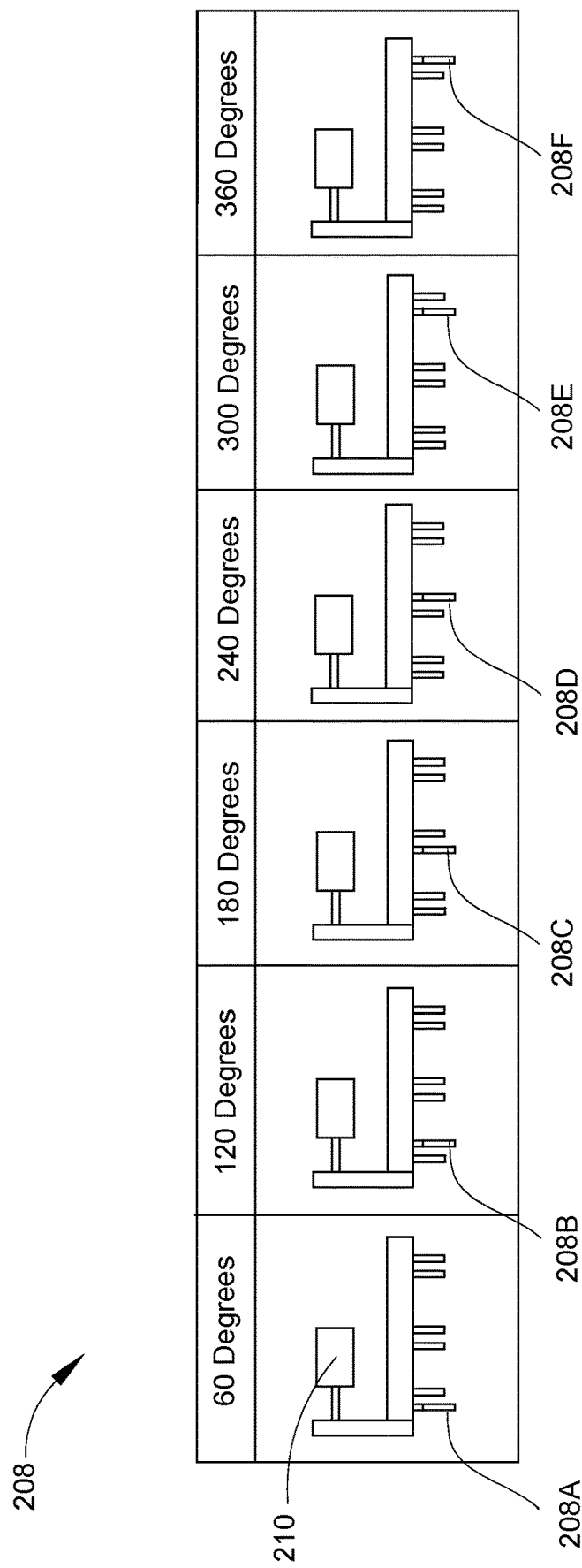

FIGS. 2A-2C are diagrams that collectively illustrate a first implementation of a camshaft of the apparatus of FIG. 1, in accordance with an embodiment of the disclosure. FIGS. 2A-2C are explained in conjunction with elements from FIG. 1. With reference to FIG. 2A, there is shown an isometric view 200 of the camshaft 112. The camshaft 112 may include a plurality of planes 202, which are disposed substantially perpendicular to the axis 116 of the camshaft 112. In an embodiment, each plane of the plurality of planes may be spaced from each other. The camshaft 112 may further include the plurality of lobes 114, which includes a first lobe 204A, a second lobe 204B, a third lobe 204C, a fourth lobe 204D, a fifth lobe 204E, and a sixth lobe 204F. In an implementation, each lobe of the plurality of lobes 114 may be disposed in a particular plane of the plurality of planes 202.

Further referring to FIG. 2A, the plurality of lobes 114 of the camshaft 112 may be equally indented, from the axis 116 of the camshaft 112, at different angular configurations (such as at every 60 degrees) in each plane of the plurality of planes 202 of the camshaft 112. Each lobe (such the first lobe 204A, the second lobe 204B, the third lobe 204C, the fourth lobe 204D, the fifth lobe 204E, or the sixth lobe 204F) of the plurality of lobes 114 may have a first profile (such as a pear shape) and configured to activate corresponding valve (such as the valve 120) of the valve train 122 (shown in FIG. 1) at different angular configurations (such as at 60 degrees, or at 120 degrees, and/or at 180 degrees, and/or at 240 degrees, and/or at 300 degrees, and/or at 360 degrees) of the camshaft 112, based on the rotation of the camshaft 112. For example, at every 60 degrees of rotation of the camshaft 112, a corresponding valve (such as the valve 120) of the valve train 122 may be actuated. Therefore, in such configuration of the camshaft 112, it may be observed that each valve (such as the valve 120) of the valve train 122 may be independently tested for the abnormality. Based on independent testing of each valve of the valve train 122, each valve (such as the valve 120) may be selectively adjusted based on the detected abnormality on each valve of the valve train 122. Such selective adjustment may enhance a quality of an assembly of the valve train 122 on the engine head 124. It may be noted that the six number of lobes shown in FIG. 2A is presented merely as an example. The plurality of lobes 114 may include less than six or more than six number of lobes, without deviation from the scope of the disclosure.

Referring to FIG. 2B, there is shown a valve displacement chart 206. The valve displacement chart 206 may be plotted between angular configurations of the camshaft 112 versus the displacement of the plurality of engagement members 110 that causes the activation of the valves (such as the valve 120) of the valve train 122. For example, the angular configurations of the camshaft 112 may be plotted along an X-axis of the valve displacement chart 206 and the displacement of the plurality of engagement members 110 may be plotted along a Y-axis of the valve displacement chart 206. Based on the valve displacement chart 206, it may be observed that, at every 60 degrees of rotation (such as at 60 degrees, or at 120 degrees, and/or at 180 degrees, and/or at 240 degrees, and/or at 300 degrees, and/or at 360 degrees) of the camshaft 112, there may be a change in the displacement of the plurality of engagement members 110.

For example, when the first lobe 204A of the camshaft 112 is disposed at 0 degrees, a first member of the plurality of engagement members 110 may be disposed at an initial displacement D0 in the apparatus 102. In operation, when the first lobe 204A of the camshaft 112 is rotated, the first member of the plurality of engagement members 110 may be translated from the initial displacement D0. Based on further rotation (for example, at 30 degrees) of the first lobe 204A of the camshaft 112, the first member of the plurality of engagement members 110 may be further translated to a maximum displacement D1. When the first member of the plurality of engagement members 110 reaches the maximum displacement D1, a first valve (such as the valve 120) of the valve train 122 may be activated. Further, based on the activation of the first valve, the apparatus 102 may be configured to test the abnormality associated with the first valve of the valve train 122. Based on the determination of the abnormality, the apparatus 102 may further transmit the notification about the abnormality to the operator, via a notification device (such as a speaker, a display unit, a lighting unit, or a vibration motor).

Based on the transmission of the notification, the apparatus 102 may further configure the driving mechanism 118 to further control the rotation of the first lobe 204A of the plurality of lobes 114 of the camshaft 112. Based on the continued rotation of the first lobe 204A, the first member of the plurality of engagement members 110 may be further retracted from the maximum displacement D1. Based on further rotation (for example, at 60 degrees) of the first lobe 204A of the camshaft 112, the first member of the plurality of engagement members 110 may be further retracted to the initial displacement D0. When the first member of the plurality of engagement members 110 reaches the initial displacement D0, the first valve (such as the valve 120) of the valve train 122 may be reset. In an embodiment, the activation and/or the reset of the first valve may be modified based on a change in the structural profile (such as a circular shape, a pear shape, a snail shape, etc.) of the first lobe 204A or a change in a structural preference (such as a change in height) of the first member of the plurality of engagement members 110. In the valve displacement chart 206, the activation and/or the reset of the first valve may be depicted as a first valve displacement 206A. The first valve displacement 206A may be an area that relate to a displacement profile of the first valve, which includes information associated with a translation of the first valve and the retraction of the first valve of the valve train 122.

Based on the reset of the first valve, the apparatus 102 may be further configured to control the rotation (for example, from 60 degrees to 120 degrees) of the second lobe 204B of the plurality of lobes 114 of the camshaft 112. Based on the rotation of the second lobe 204B, the apparatus 102 may be configured to translate a second member of the plurality of engagement members 110 to activate a second valve of the valve train 122, to form a second valve displacement 206B. Upon activation of the second valve, the apparatus 102 may be configured to reset the second valve. Based on the reset of the second valve, the apparatus 102 may be further configured to control the rotation (for example, from 120 degrees to 180 degrees) of the third lobe 204C of the plurality of lobes 114 of the camshaft 112. Based on the rotation of the third lobe 204C, the apparatus 102 may be configured to translate a third member of the plurality of engagement members 110 to activate a third valve of the valve train 122, to form a third valve displacement 206C. Similarly, a fourth valve of the valve train 122 may be activated based on the rotation (for example, from 180 degrees to 240 degrees) of the fourth lobe 204D to form a fourth valve displacement 206D, a fifth valve of the valve train 122 may be activated based on the rotation (for example, from 240 degrees to 300 degrees) of the fifth lobe 204E to form a fifth valve displacement 206E, a sixth valve of the valve train 122 may be activated based on the rotation (for example, from 300 degrees to 360 degrees) of the sixth lobe 204F, to form a sixth valve displacement 206F. From the valve displacement chart 206, it may be observed that all valves of the valve train 122 may be uniformly activated at the maximum displacement D1. Therefore, as the apparatus 102 facilitates a uniform displacement of all members of the plurality of engagement members 110 and a subsequent uniform displacement of all valves of the valve train 122, there may be a stability in the apparatus 102.

Referring to FIG. 2C, there is shown a valve displacement implementation 208. In the valve displacement implementation 208, the apparatus 102 may include the driving mechanism 118 that may be coupled with the plurality of engagement members 110, which may be coupled with the valves (such as a first valve 208A, a second valve 208B, a third valve 208C, a fourth valve 208D, a fifth valve 208E, and a sixth valve 208F) of the valve train 122. The driving mechanism 118 may include an actuator 210 to control the rotation of the camshaft 112 and translate each of the plurality of engagement members 110 based on the rotation of the camshaft 112. The translation of each of the plurality of engagement members 110 may subsequently control the translation of the valves of the valve train 122. In an embodiment, the actuator 210 may include at least one of: a servomotor or an induction motor. In an implementation, the actuator 210 of the driving mechanism 118 may be configured to control at least one of: a position of the camshaft 112, a velocity of the camshaft 112, or an acceleration of the camshaft 112.

Based on the control of the actuator 210, the valves (such as a first valve 208A, a second valve 208B, a third valve 208C, a fourth valve 208D, a fifth valve 208E, and a sixth valve 208F) of the valve train 122 may be actuated. For example, based on the rotation of the first lobe 204A and subsequent translation of the first member of the plurality of engagement members 110, the first valve 208A may be actuated. The actuation of the first valve 208A may be related to the first valve displacement 206A of the valve displacement chart 206, as shown in FIG. 2B. Similarly, based on the rotation of the second lobe 204B and subsequent translation of the second member of the plurality of engagement members 110, the second valve 208B may be actuated. The actuation of the second valve 208B may be related to the second valve displacement 206B of the valve displacement chart 206, as shown in FIG. 2B, and vice versa for at least one of: the third valve 208C, the fourth valve 208D, the fifth valve 208E, and the sixth valve 208F actuations, based on different angular configurations of the camshaft 112. In another embodiment, the camshaft 112 may also be configured to activate all valves at once. Details of such configuration of the camshaft are further described, for example, in FIGS. 3A-3C.

Figure 3B:
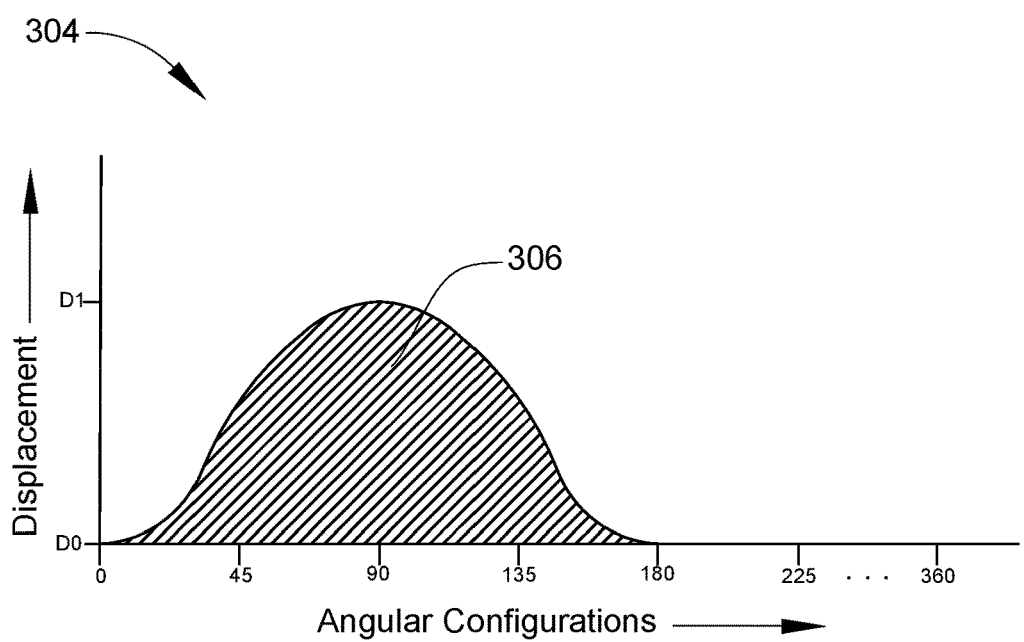
Figure 3C:
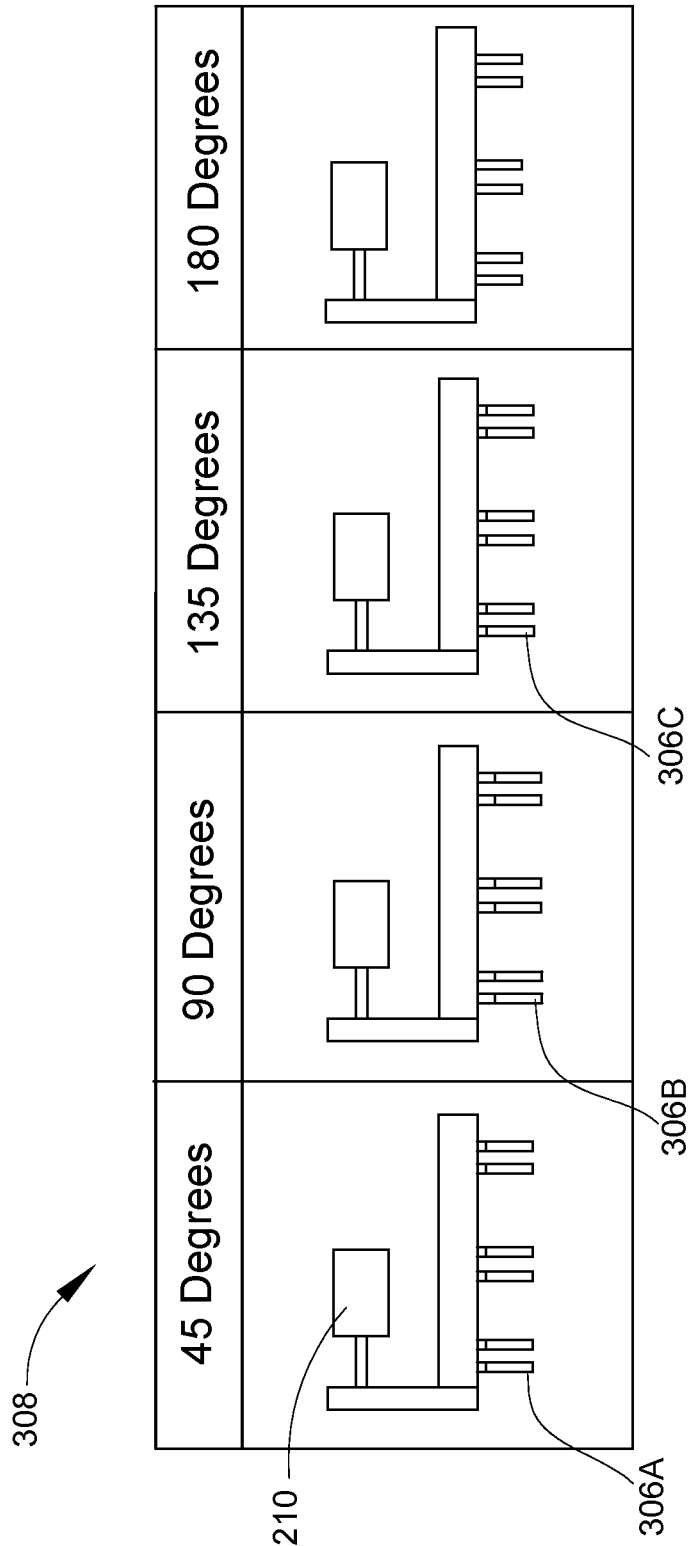

FIGS. 3A-3C are diagrams that collectively illustrate a second implementation of a camshaft of the apparatus of FIG. 1, in accordance with an embodiment of the disclosure. FIGS. 3A-3C are explained in conjunction with elements from FIG. 1, and FIGS. 2A-2C. With reference to FIG. 3A, there is shown an isometric view 300 of a second implementation of the camshaft 112. The camshaft 112 may include the plurality of planes 202, which are disposed substantially perpendicular to the axis 116 of the camshaft 112. In an embodiment, each plane of the plurality of planes 202 may be equally spaced from each other. The camshaft 112 may further include the plurality of lobes 114, which includes a first lobe 302A, a second lobe 302B, a third lobe 302C, a fourth lobe 302D, a fifth lobe 302E, and a sixth lobe 302F. In an implementation, each lobe of the plurality of lobes 114 may be disposed in a particular plane of the plurality of planes 202.

Further referring to FIG. 3A, the plurality of lobes 114 of the camshaft 112 may be disposed at a fixed angle (such as at 90 degrees), from the axis 116 of the camshaft 112, in each plane of the plurality of planes 202 of the camshaft 112. Each lobe (such as the first lobe 302A, the second lobe 302B, the third lobe 302C, the fourth lobe 302D, the fifth lobe 302E, or the sixth lobe 302F) of the plurality of lobes 114 may have a second profile (such as an eight-power polynomial single lobe) and configured to activate corresponding valve (such as the valve 120) of the valve train 122 (shown in FIG. 1) at a fixed angular configuration (such as at 90 degrees) of the camshaft 112, based on the rotation of the camshaft 112. For example, at a specific degree (such as 90 degrees) of rotation of the camshaft 112, all valves of the valve train 122 may be actuated. Further, in such configuration of the camshaft 112, it may be observed that, due to the eight-power polynomial single lobe profile of each lobe of the plurality of lobes 114, each valve of the valve train 122 may be configured to slowly actuate (such as a $8^{th}$ order polynomial lift) with a high precision. For example, based on the slow actuation, each valve of the valve train may be tested at each frames of rotation of the camshaft with the high precision. Therefore, in such configuration of the camshaft 112, it may be observed that each valve of the valve train 122 may be tested for the abnormality with the high precision. Such high precision in testing of the valves may improve machine life (such as an engine life) and further enhanced a quality of the valve train 122 assembly on the engine head 124.

Referring to FIG. 3B, there is shown a valve displacement chart 304. The valve displacement chart 304 may be plotted between angular configurations of the camshaft 112 versus the displacement of the plurality of engagement members 110 that causes the activation of all the valves (such as the valve 120) of the valve train 122. For example, the angular configurations of the camshaft 112 may be plotted along an X-axis of the valve displacement chart 304 and the displacement of the plurality of engagement members 110 may be plotted along a Y-axis of the valve displacement chart 304. Based on the valve displacement chart 304, it may be observed that, from 0 degrees to 180 degrees of rotation of the camshaft 112, there may be a change in the displacement of the plurality of engagement members 110.

For example, when each lobe (such as the first lobe 302A, the second lobe 302B, the third lobe 302C, the fourth lobe 302D, the fifth lobe 302E, or the sixth lobe 302F) of the plurality of lobes 114 of the camshaft 112 is disposed at 0 degrees, all members of the plurality of engagement members 110 may be disposed at the initial displacement D0 in the apparatus 102. In operation, when each lobe (such as the first lobe 302A, the second lobe 302B, the third lobe 302C, the fourth lobe 302D, the fifth lobe 302E, or the sixth lobe 302F) of the plurality of lobes 114 of the camshaft 112 is rotated, all the members of the plurality of engagement members 110 may be translated from the initial displacement D0. Based on further rotation (for example, at 90 degrees) of each lobe (such as the first lobe 302A, the second lobe 302B, the third lobe 302C, the fourth lobe 302D, the fifth lobe 302E, or the sixth lobe 302F) of the plurality of lobes 114 of the camshaft 112, all the members of the plurality of engagement members 110 may be further translated to the maximum displacement D1. When all the members of the plurality of engagement members 110 reaches the maximum displacement D1, all valves (such as the valve 120) of the valve train 122 may be slowly activated with a precision.

Based on the precise activation of all valves of the valve train 122, the apparatus 102 may be configured to determine the abnormality associated with each valve of the valve train 122 with the high precision. Based on the determination of the abnormality, the apparatus 102 may further transmit the notification about the abnormality to the operator, via a notification device (such as a speaker, a display unit, a lighting unit, or a vibration motor).

Based on the transmission of the notification, the apparatus 102 may further configure the driving mechanism 118 to further control the rotation of each lobe (such as the first lobe 302A, the second lobe 302B, the third lobe 302C, the fourth lobe 302D, the fifth lobe 302E, or the sixth lobe 302F) of the plurality of lobes 114 of the camshaft 112. Based on the continued rotation of the first lobe 204A, the first member of the plurality of engagement members 110 may be further retracted from the maximum displacement D1. Based on further rotation (for example, at 180 degrees) of each lobe (such as the first lobe 302A, the second lobe 302B, the third lobe 302C, the fourth lobe 302D, the fifth lobe 302E, or the sixth lobe 302F) of the plurality of lobes 114 of the camshaft 112, all the members of the plurality of engagement members 110 may be further retracted to the initial displacement D0. When all the members of the plurality of engagement members 110 reaches the initial displacement D0, all the valves of the valve train 122 may be reset. In an embodiment, the activation and/or the reset of the first valve may be modified based on a change in the structural profile (such as a circular shape, a pear shape, a snail shape, etc.) of each lobe (such as the first lobe 302A, the second lobe 302B, the third lobe 302C, the fourth lobe 302D, the fifth lobe 302E, or the sixth lobe 302F) of the plurality of lobes 114 of the camshaft 112, or a change in a structural preference (such as a change in height) of each member of the plurality of engagement members 110. In the valve displacement chart 304, the activation and/or the reset of each valve of the valve train 122 may be depicted as a valve displacement 306. The valve displacement 306 may be an area that relate to a displacement profile of each valve of the valve train 122, which includes information associated with a translation of each valve of the valve train 122 and the retraction of each valve of the valve train 122 for the second implementation of the camshaft 112 shown in FIG. 3A. Based on the reset of all the valves of the valve train 122, the apparatus 102 may be further configured to control the rotation (for example, from 0 degrees to 180 degrees) for a second iteration of activation of each valve of the valve train 122. The second iteration of activation of each valve of the valve train 122 may also be identical to the valve displacement 306 shown in the valve displacement chart 304.

Referring to FIG. 3C, there is shown a valve displacement implementation 208. In the valve displacement implementation 208, the apparatus 102 may include the driving mechanism 118 that may be coupled with the plurality of engagement members 110, which may be coupled with the valves (such as the valve 120) of the valve train 122. The driving mechanism 118 may include the actuator 210 to control the rotation of the camshaft 112 and subsequently control the translation of the valves of the valve train 122. Based on the control of the actuator 210 on the camshaft 112, the valves of the valve train 122 may be actuated.

For example, based on the control of the actuator 210, each lobe (such as the first lobe 302A, the second lobe 302B, the third lobe 302C, the fourth lobe 302D, the fifth lobe 302E, or the sixth lobe 302F) of the plurality of lobes 114 of the camshaft 112 may be rotated. Based on the rotation of the plurality of lobes 114 of the camshaft 112, the apparatus 102 may further configured to translate each member of the plurality of engagement members 110, and subsequently activate each valve of the valve train 122. The actuation of each valve of the valve train 122 may be related to the valve displacement 306 of the valve displacement chart 304, as shown in FIG. 3B.

Referring again to FIG. 3C, it may be observed that, all valves of the valve train 122 may be actuated with the high precision. For example, based on an initial rotation (such as at 45 degrees) of each lobe (such as the first lobe 302A, the second lobe 302B, the third lobe 302C, the fourth lobe 302D, the fifth lobe 302E, or the sixth lobe 302F) of the plurality of lobes 114 of the camshaft 112, all valves of the valve train 122 may be slowly displaced to a primary valve displacement 306A based on a slow displacement of all members of the plurality of engagement members 110 from the initial displacement D0. Based on a continued rotation (such as at 90 degrees) of each lobe (such as the first lobe 302A, the second lobe 302B, the third lobe 302C, the fourth lobe 302D, the fifth lobe 302E, or the sixth lobe 302F) of the plurality of lobes 114 of the camshaft 112, all valves of the valve train 122 may be slowly displaced to a secondary valve displacement 306B based on a slow displacement of all members of the plurality of engagement members 110 from the initial displacement D0 to the maximum displacement D1. In an embodiment, the secondary valve displacement 306B may be higher than the primary valve displacement 306A, as shown in FIG. 3C.

Based on a further continued rotation (such as at 135 degrees) of each lobe (such as the first lobe 302A, the second lobe 302B, the third lobe 302C, the fourth lobe 302D, the fifth lobe 302E, or the sixth lobe 302F) of the plurality of lobes 114 of the camshaft 112, all valves of the valve train 122 may be slowly retracted from the secondary valve displacement 306B to a tertiary valve displacement 306C, based on a slow displacement of all members of the plurality of engagement members 110 from the maximum displacement D1 towards the initial displacement D0. In an embodiment, the tertiary valve displacement 306C may be lesser than the secondary valve displacement 306B, as shown in FIG. 3C.

Based on a further rotation (such as at 180 degrees) of each lobe (such as the first lobe 302A, the second lobe 302B, the third lobe 302C, the fourth lobe 302D, the fifth lobe 302E, or the sixth lobe 302F) of the plurality of lobes 114 of the camshaft 112, all valves of the valve train 122 may be slowly displaced back to a reset position, based on a slow displacement of all members of the plurality of engagement members 110 to the initial displacement D0. In another embodiment, the camshaft 112 may also be configured to activate all valves for a plurality of occurrences. Details of such configuration of the camshaft are further described, for example, in FIGS. 4A-4C.

Figure 4B:
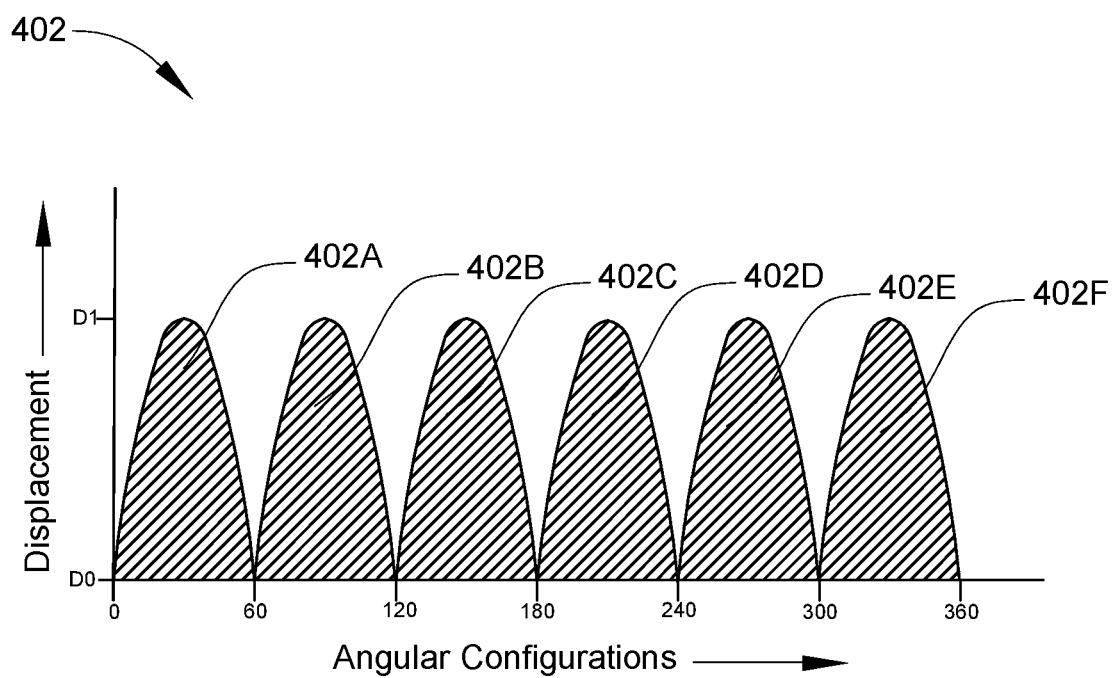
Figure 4C:
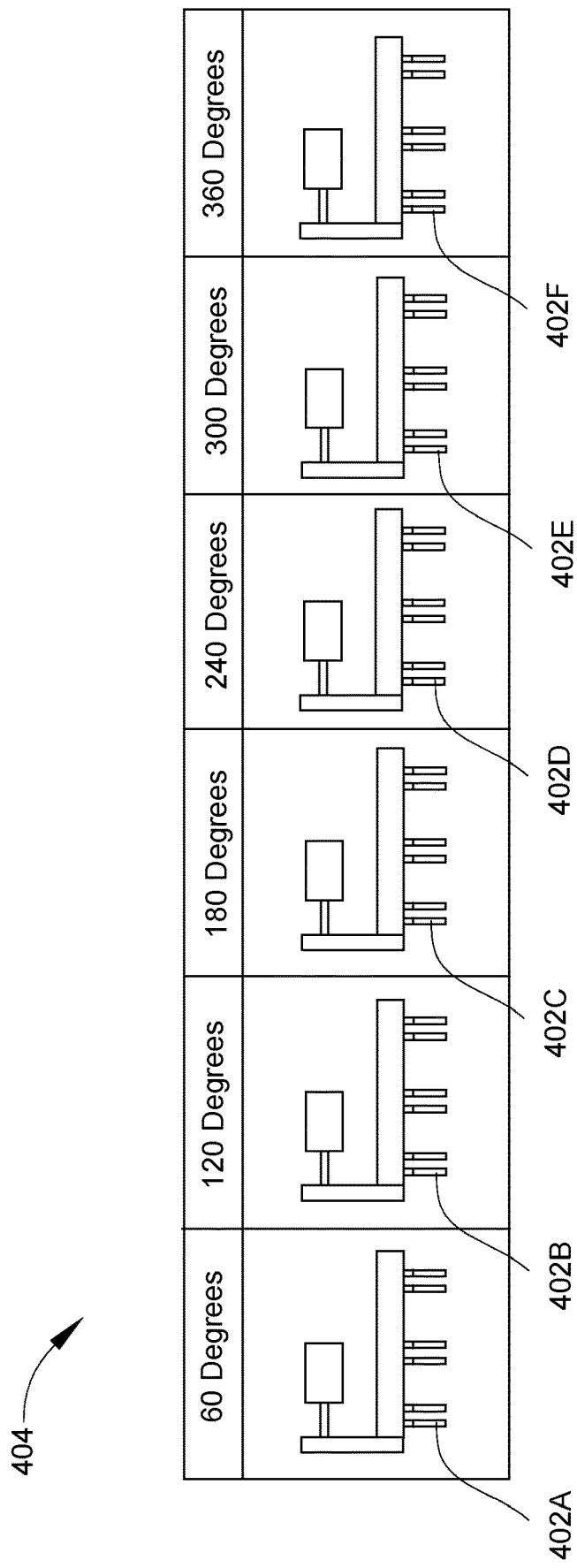

FIGS. 4A-4C are diagrams that collectively illustrate a third implementation of a camshaft of the apparatus of FIG. 1, in accordance with an embodiment of the disclosure. FIGS. 4A-4C are explained in conjunction with elements from FIG. 1, FIGS. 2A-2C, and FIGS. 3A-3C. With reference to FIG. 4A, there is shown an isometric view 400 of the camshaft 112. The camshaft 112 may include the plurality of planes 202, which are disposed substantially perpendicular to the axis 116 of the camshaft 112. In an embodiment, each plane of the plurality of planes may be spaced from each other. The camshaft 112 may further include the plurality of lobes 114. In an implementation, the plurality of lobes 114 of the camshaft 112 may be disposed in at least one plane of the plurality of planes 202.

Further referring to FIG. 4A, each lobe of the plurality of lobes 114 may have a multilobe structure (such as a toothed gear profile) and configured to activate each valve (such as the valve 120) of the valve train 122 for a plurality of occurrences, based on the rotation of the camshaft 112. In an example, the plurality of occurrences of the activation of each valve of the valve train 122, may be determined based on a number of the plurality of lobes 114 on each plane of the camshaft 112. For example, in case there are six numbers of the plurality of lobes 114 on each plane of the camshaft 112, there may be six occurrences of the activation of each valve of the valve train 122. In another example, in case there are more than six numbers of the plurality of lobes 114 on each plane of the camshaft 112, there may be more than six occurrences of the activation of each valve of the valve train 122. Therefore, it may be observed that the occurrences of activation of each valve of the valve train 122 may be directly proportional to the number of the plurality of lobes 114 on each plane of the camshaft 112.

In an implementation, at every 60 degrees of rotation of the camshaft 112, all valves of the valve train 122 may be actuated simultaneously. Therefore, in such configuration of the camshaft, it may be observed that each valve of the valve train 122 may be tested for the plurality of occurrences to determine the abnormality. Based on the plurality of occurrences, each valve may be redundantly tested, so that there may be a precision in the assembly of valves in the engine head 124. Further, as the camshaft 112 have the multilobe structure, the plurality of occurrences of testing the valves of the valve train 122 may be performed with a minimal cycle time.

Referring to FIG. 4B, there is shown a plurality of occurrences chart 402. The plurality of occurrences chart 402 may be plotted between angular configurations of the camshaft 112 versus the displacement of the plurality of engagement members 110 that causes the activation of the valves (such as the valve 120) of the valve train 122. For example, the angular configurations of the camshaft 112 may be plotted along an X-axis of the plurality of occurrences chart 402 and the displacement of the plurality of engagement members 110 may be plotted along a Y-axis of the plurality of occurrences chart 402. Based on the plurality of occurrences chart 402, it may be observed that, at every 60 degrees of rotation (such as at 60 degrees, or at 120 degrees, and/or at 180 degrees, and/or at 240 degrees, and/or at 300 degrees, and/or at 360 degrees) of the camshaft 112, there may be a change in the displacement of the plurality of engagement members 110.

For example, when the plurality of lobes 114 of the camshaft 112 is disposed at 0 degrees, all the members of the plurality of engagement members 110 may be disposed at an initial displacement D0 in the apparatus 102. In operation, when the plurality of lobes 114 of the camshaft 112 are rotated, all the members of the plurality of engagement members 110 may be translated from the initial displacement D0. Based on further rotation (for example, at 30 degrees) of the plurality of lobes 114 of the camshaft 112, all the members of the plurality of engagement members 110 may be further translated to a maximum displacement D1. When all members of the plurality of engagement members 110 reaches the maximum displacement D1, each valve of the valve train 122 may be activated. Further, based on the activation of each valve of the valve train 122, the apparatus 102 may be configured to test the abnormality associated with each valve of the valve train 122. Based on the determination of the abnormality, the apparatus 102 may further transmit the notification about the abnormality of each valve to the operator, via a notification device (such as a speaker, a display unit, a lighting unit, or a vibration motor).

Based on the transmission of the notification, the apparatus 102 may further configure the driving mechanism 118 to further control the rotation of the plurality of lobes 114 of the camshaft 112. Based on the continued rotation of the plurality of lobes 114, each member of the plurality of engagement members 110 may be further retracted from the maximum displacement D1. Based on further rotation (for example, at 60 degrees) of the plurality of lobes 114 of the camshaft 112, each member of the plurality of engagement members 110 may be further retracted to the initial displacement D0. When the first member of the plurality of engagement members 110 reaches the initial displacement D0, each valve of the valve train 122 may be reset. In an embodiment, the activation and/or the reset of the first valve may be modified based on a change in the structural profile (such as a tooth profile of a gear shaped lobes, etc.) of the plurality of lobes 114 or a change in a structural preference (such as a change in height) of each member of the plurality of engagement members 110.

In the plurality of occurrences chart 402, the activation and/or the reset of a first valve may be depicted as a first occurrence displacement 402A. The first occurrence displacement 402A may be an area that relate to a displacement profile of the first valve, which includes information associated with a translation of the first valve and the retraction of the first valve of the valve train 122. Similarly, the first valve of the valve train 122 may be activated and retracted for the plurality of occurrences, based on the number of the plurality of lobes 114 of the camshaft 112. In case there are six number of the plurality of lobes 114 on each plane, based on a completion of the first occurrence displacement 402A, the apparatus 102 may be further configured to perform activation and retraction of the first valve for a second occurrence displacement 402B, a third occurrence displacement 402C, a fourth occurrence displacement 402D, a fifth occurrence displacement 402E, and a sixth occurrence displacement 402F, as shown in FIG. 4B.

Referring to FIG. 4C, there is shown a plurality of occurrences implementation 404. In the plurality of occurrences implementation 404, the apparatus 102 may include the driving mechanism 118 that may be coupled with the plurality of engagement members 110, which may be coupled with the valves of the valve train 122 (as described in FIG. 1). The driving mechanism 118 may include the actuator 210 to control the rotation of the camshaft 112 and subsequently control the translation of the valves of the valve train 122.

Based on the control of the actuator 210 on the plurality of lobes 114 of the camshaft 112, each valve of the valve train 122 may be actuated for the plurality of occurrences. For example, based on the rotation of the plurality of lobes 114 and subsequent translation of the first member of the plurality of engagement members 110, each valve (for example, the first valve) of the valve train 122 may be actuated. In an example, the first valve may be actuated for the plurality of occurrences (such as the first occurrence displacement 402A, the second occurrence displacement 402B, the third occurrence displacement 402C, the fourth occurrence displacement 402D, the fifth occurrence displacement 402E, and the sixth occurrence displacement 402F), as shown in FIG. 4B. Similarly, based on the rotation of the plurality of lobes 114 of the camshaft 112 and subsequent translation of a second member of the plurality of engagement members 110, a second valve may be actuated for the plurality of occurrences. Similarly, based on the rotation of the plurality of lobes 114 of the camshaft 112 and subsequent translation of at least one of: a third member, a fourth member, a fifth member, or a sixth member of the plurality of engagement members 110, corresponding at least one of: a third valve, a fourth valve, a fifth valve, or a sixth valve of the valve train 122 may be actuated for the plurality of occurrences respectively, and thus, improving the precision in testing of the abnormality based on the plurality of occurrences of the activation of each valve of the valve train 122.

Figure 5:
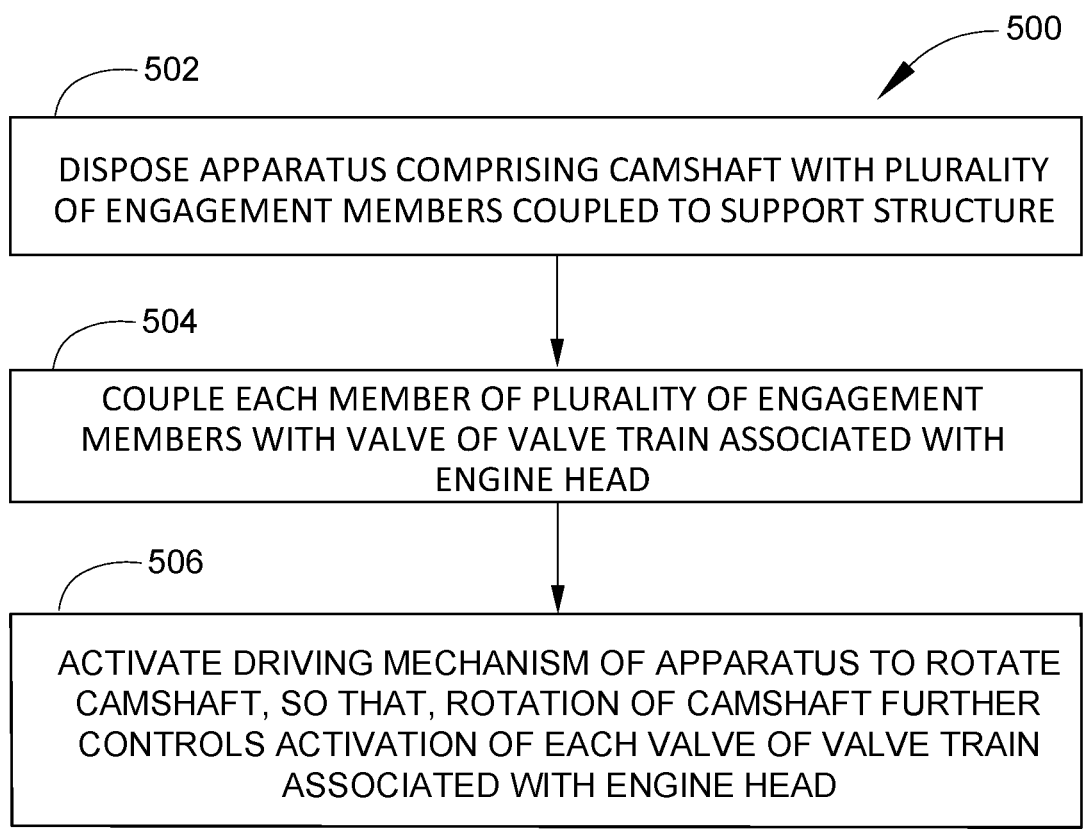
FIG. 5 is a flowchart that illustrates an exemplary method for testing valves via the apparatus of FIG. 1, in accordance with an embodiment of the disclosure.

FIG. 5 is a flowchart that illustrates an exemplary method for testing valves via the apparatus of FIG. 1, in accordance with an embodiment of the disclosure. FIG. 5 is explained in conjunction with elements from FIGS. 1, 2A-2C, 3A-3C, and 4A-4C. With reference to FIG. 5, there is shown a flowchart 500 that depicts for testing each valve of the valve train 122, via the apparatus 102. The method illustrated in the flowchart 500 may start from 502.

At 502, the apparatus 102 may be disposed in the floor (such as the assembly line). The apparatus 102 may include the camshaft 112 and the plurality of engagement members 110 that may be coupled to the support structure 104 of the apparatus 102, as described in FIG. 1

At 504, each member of the plurality of engagement members 110 may be coupled to a valve (such as the valve 120) of the valve train 122 associated with the engine head 124, as described in FIG. 1.

At 506, the driving mechanism 118 may be activated to control the rotation of the camshaft 112, so that, the rotation of the camshaft 112 may further control the activation of each valve of the valve train 122 associated with the engine head 124. In an embodiment, the apparatus 102 may configure the driving mechanism 118 to control the rotation of the camshaft 112, so that, the rotation of the camshaft 112 may control the translation of each member of the plurality of engagement members 110, which may further control the activation of each valve of the valve train 122 associated with the engine head 124, as described in FIGS. 1, 2A-2C, 3A-3C, and 4A-4C. Control may pass to end.

The flowchart 500 is illustrated as discrete operations, such as 502, 504, and 506. However, in certain embodiments, such discrete operations may be further divided into additional operations, combined into fewer operations, or eliminated, or rearranged depending on the implementation without detracting from the essence of the disclosed embodiments.

For the purposes of the present disclosure, expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural. Further, all joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

The foregoing description of embodiments and examples has been presented for purposes of illustration and description. It is not intended to be exhaustive or limiting to the forms described. Numerous modifications are possible considering the above teachings. Some of those modifications have been discussed and others will be understood by those skilled in the art. The embodiments were chosen and described for illustration of various embodiments. The scope is, of course, not limited to the examples or embodiments set forth herein but can be employed in any number of applications and equivalent devices by those of ordinary skill in the art. Rather it is hereby intended the scope be defined by the claims appended hereto. Additionally, the features of various implementing embodiments may be combined to form further embodiments.

What is claimed is:

1. An apparatus, comprising:
   a support structure comprising a base and a wall coupled substantially perpendicular to the base, wherein the base has a first surface and a second surface;
   a plurality of engagement members coupled substantially perpendicular to the base and moveably extend from the first surface to the second surface, wherein each member of the plurality of engagement members includes a first end and a second end, wherein the second end of one of the plurality of engagement members is configured to be coupled with a valve of a valve train associated with an engine head;
   a camshaft, which comprises a plurality of lobes, coupled substantially perpendicular to the wall and configured to rotate about an axis that is substantially parallel to the base, wherein each lobe of the plurality of lobes is spaced from each other and coupled to the first end of one of the plurality of engagement members; and
   a driving mechanism coupled to the camshaft, wherein the driving mechanism is configured to rotate the camshaft and control each member of the plurality of engagement members to further control an activation of each valve of the valve train associated with the engine head, and wherein based on the activation of each valve of the valve train, the apparatus is configured to determine an abnormality in each valve of the valve train and generate a notification based on the determined abnormality in each valve of the valve train.

2. The apparatus according to claim 1, wherein, when activated, the camshaft is configured to rotate and facilitate a translation of each member of the plurality of engagement members based on the rotation of the camshaft, and wherein the translation of each member of the plurality of engagement members controls the activation of each valve of the valve train associated with the engine head.

3. The apparatus according to claim 1, wherein the camshaft further comprises a plurality of planes, wherein each plane of the plurality of planes is equally spaced from each other, and wherein each lobe of the plurality of lobes of the camshaft is disposed at each plane of the plurality of planes.

4. The apparatus according to claim 3, wherein each lobe of the plurality of lobes is equally indented, from the axis of the camshaft, at different angular configurations in each plane of the plurality of planes, and wherein each lobe of the plurality of lobes is configured to activate corresponding valve of the valve train at different angular configurations of the camshaft, based on the rotation of the camshaft.

5. The apparatus according to claim 3, wherein each lobe of the plurality of lobes is disposed at a fixed angle, from the axis of the camshaft, in each plane of the plurality of planes of the camshaft, and wherein each lobe of the plurality of lobes is configured to activate corresponding valve of the valve train at a fixed angular configuration of the camshaft, based on the rotation of the camshaft.

6. The apparatus according to claim 1, wherein the camshaft further comprises a plurality of planes, wherein each plane of the plurality of planes is equally spaced from each other, and wherein each lobe of the plurality of lobes of the camshaft is disposed at each plane of the plurality of planes, and
   wherein each lobe of the plurality of lobes is configured to activate each valve of the valve train for a plurality of occurrences, based on the rotation of the camshaft.

7. The apparatus according to claim 6, wherein the plurality of occurrences of the activation of each valve of the valve train, is determined based on a number of the plurality of lobes on each plane of the camshaft.

8. The apparatus according to claim 1, wherein each member of the plurality of engagement members has a monolithic structure that are configured to be coupled with a corresponding lobe of the plurality of lobes.

9. The apparatus according to claim 1, wherein each member of the plurality of engagement members is axially coupled with a corresponding valve of the valve train.

10. The apparatus according to claim 1, wherein each lobe of the plurality of lobes of the camshaft has a monolithic structure, and wherein the monolithic structure is machined to form the camshaft.

11. The apparatus according to claim 1, wherein each lobe of the plurality of lobes is coupled to the camshaft, via a splined arrangement.

12. The apparatus according to claim 1, wherein the driving mechanism comprises at least one of: a servomotor or an induction motor, and wherein the driving mechanism is configured to control at least one of: a position of the camshaft, a velocity of the camshaft, or an acceleration of the camshaft.

13. The apparatus according to claim 1, wherein the notification comprises at least one of: an audible notification, a visual notification, or a tactile notification.

14. An apparatus, comprising:
    a support structure;
    a plurality of engagement members coupled to the support structure, wherein each member of the plurality of engagement members is configured to be coupled with a valve of a valve train;
    a camshaft, which comprises a plurality of lobes, coupled to the support structure, wherein each lobe of the plurality of lobes is spaced from each other; and coupled to a member of the plurality of engagement members; and a driving mechanism coupled to the camshaft, wherein the driving mechanism is configured to rotate the camshaft and control each member of the plurality of engagement members to further control an activation of each valve of the valve train, wherein based on the activation of each valve of the valve train, the apparatus is configured to determine an abnormality in each valve of the valve train and generate a notification based on the determined abnormality in each valve of the valve train.

15. The apparatus according to claim 14, the camshaft further comprises a plurality of planes, wherein each plane of the plurality of planes is equally spaced from each other, and wherein each lobe of the plurality of lobes of the camshaft is disposed at each plane of the plurality of planes, and wherein each lobe of the plurality of lobes is configured to activate each valve of the valve train for a plurality of occurrences, based on the rotation of the camshaft.

16. The apparatus according to claim 14, wherein each lobe of the plurality of lobes is equally indented, from an axis of the camshaft, at different angular configurations in each plane of a plurality of planes, and wherein each lobe of the plurality of lobes is configured to activate corresponding valve of the valve train at different angular configurations of the camshaft, based on the rotation of the camshaft.

17. An apparatus, comprising:
a support structure;
a plurality of engagement members coupled to the support structure, wherein each member of the plurality of engagement members is configured to be coupled with a valve of a plurality of valves associated with a machine;
a camshaft, which comprises a plurality of lobes, coupled to the support structure, wherein each lobe of the plurality of lobes is spaced from each other; and coupled to a member of the plurality of engagement members; and
a driving mechanism coupled to the camshaft, wherein the driving mechanism is configured to rotate the camshaft and control each member of the plurality of engagement members to further control an activation of each valve of the plurality of valves associated with the machine, wherein based on the activation of each valve of the plurality of valves associated with the machine, the apparatus is configured to determine an abnormality in each valve of the plurality of valves and generate a notification based on the determined abnormality in each valve of the plurality of valves.

18. The apparatus according to claim 17, wherein the machine comprises at least one of: an exercising machine, a metering device, a laundry machine, or a medical instrument.

19. The apparatus according to claim 17, wherein, when activated, the camshaft is configured to rotate and facilitate a translation of each member of the plurality of engagement members based on the rotation of the camshaft, and wherein the translation of each member of the plurality of engagement members controls the activation of each valve of the plurality of valves associated with the machine.

* * * * *